US008859679B2

(12) United States Patent
Jackson et al.

(10) Patent No.: US 8,859,679 B2
(45) Date of Patent: *Oct. 14, 2014

(54) AQUEOUS SOLUTIONS OF OPTICAL BRIGHTENERS

(75) Inventors: Andrew Clive Jackson, Harrogate (GB); Alec Stewart Tindal, Leeds (GB); Mariela Gauto, Leeds (GB)

(73) Assignee: Clariant Finance (BVI) Limited (VG)

( * ) Notice: Subject to any disclaimer, the term of this patent is extended or adjusted under 35 U.S.C. 154(b) by 255 days.

This patent is subject to a terminal disclaimer.

(21) Appl. No.: 11/918,188

(22) PCT Filed: Apr. 5, 2006

(86) PCT No.: PCT/EP2006/061329
§ 371 (c)(1),
(2), (4) Date: Oct. 9, 2007

(87) PCT Pub. No.: WO2006/108785
PCT Pub. Date: Oct. 19, 2006

(65) Prior Publication Data
US 2009/0081475 A1    Mar. 26, 2009

(30) Foreign Application Priority Data

Apr. 8, 2005 (EP) .................... 05007691

(51) Int. Cl.
| C09D 5/22 | (2006.01) |
| C09D 131/04 | (2006.01) |
| C09D 129/04 | (2006.01) |
| D21H 19/36 | (2006.01) |
| D21H 19/44 | (2006.01) |
| D21H 19/46 | (2006.01) |
| D21H 19/60 | (2006.01) |
| C08L 29/04 | (2006.01) |
| C08K 5/16 | (2006.01) |
| C08K 5/34 | (2006.01) |
| C08K 5/3432 | (2006.01) |
| C08K 5/3467 | (2006.01) |
| C08K 5/3477 | (2006.01) |
| C08K 5/3492 | (2006.01) |
| C08K 5/36 | (2006.01) |
| C08K 5/41 | (2006.01) |
| D21H 21/30 | (2006.01) |

(52) U.S. Cl.
CPC ............... *D21H 21/30* (2013.01); *D21H 19/46* (2013.01)
USPC ............... 525/56; 525/58; 525/88; 525/191; 525/221; 525/231; 525/241; 544/193.1; 544/193.2; 544/194; 544/196; 544/197; 544/210; 544/211; 544/213; 524/503; 524/557; 524/86; 524/99; 524/100; 524/102; 524/155; 524/157; 524/158; 524/159; 524/161; 524/162; 252/301.21; 252/301.22; 252/301.32

(58) Field of Classification Search
USPC ............... 428/532, 536, 537.5; 427/411
See application file for complete search history.

(56) References Cited

U.S. PATENT DOCUMENTS

| 4,036,778 | A | * | 7/1977 | Lohmann .................. 252/301.21 |
| 4,879,336 | A | * | 11/1989 | Schilling et al. ............. 524/503 |
| 4,888,128 | A | | 12/1989 | Koll et al. |
| 4,997,870 | A | * | 3/1991 | Schilling et al. ............. 524/423 |
| 5,759,347 | A | * | 6/1998 | Leube et al. .................. 162/135 |
| 5,873,913 | A | * | 2/1999 | Cowman et al. .................. 8/648 |
| 6,210,449 | B1 | * | 4/2001 | Rohringer et al. ............... 8/648 |
| 6,297,317 | B1 | * | 10/2001 | Egraz et al. .................... 524/803 |
| 6,723,846 | B1 | * | 4/2004 | Metzger et al. ............. 544/193.2 |
| 6,890,454 | B2 | * | 5/2005 | Farrar et al. ............. 252/301.21 |
| 6,911,116 | B2 | * | 6/2005 | Farrar et al. .................... 162/135 |
| 6,964,993 | B2 | * | 11/2005 | Leyrer et al. .................. 524/503 |
| 7,019,134 | B2 | * | 3/2006 | Farrar et al. ................. 544/193.2 |
| 7,060,201 | B2 | * | 6/2006 | Farrar ....................... 252/301.23 |
| 7,198,731 | B2 | * | 4/2007 | Jackson ................... 252/301.23 |
| 7,258,815 | B2 | * | 8/2007 | Drenker et al. ........... 252/301.35 |
| 7,641,765 | B2 | * | 1/2010 | Blum et al. .................... 162/137 |
| 7,790,815 | B2 | * | 9/2010 | Vicari .............................. 526/65 |
| 7,812,156 | B2 | * | 10/2010 | Jackson et al. ............. 544/193.2 |
| 7,994,265 | B2 | * | 8/2011 | Vicari .............................. 526/65 |
| 2003/0010459 | A1 | * | 1/2003 | Farrar et al. .................... 162/135 |
| 2003/0013628 | A1 | * | 1/2003 | Farrar et al. .................... 510/394 |
| 2003/0020046 | A1 | * | 1/2003 | Leyrer et al. ............. 252/301.21 |
| 2003/0089888 | A1 | * | 5/2003 | Bacher et al. ............. 252/301.21 |
| 2003/0188393 | A1 | * | 10/2003 | Tindal ............................. 8/532 |
| 2003/0236326 | A1 | * | 12/2003 | Drenker et al. ............... 524/100 |
| 2004/0013888 | A1 | * | 1/2004 | Bacher et al. .................. 428/447 |
| 2004/0237846 | A1 | * | 12/2004 | Farrar ........................... 106/499 |

(Continued)

FOREIGN PATENT DOCUMENTS

| EP | 1355004 | 10/2003 |
| EP | PT1242392 E | 7/2004 |
| JP | 62106965 | 5/1997 |
| WO | WO 96/00221 | 1/1996 |
| WO | WO 98/42685 | 10/1998 |

(Continued)

OTHER PUBLICATIONS

Co-pending U.S. Appl. No. 12/376,691, filed Feb. 6, 2009 by Gauto et al.
Co-pending U.S. Appl. No. 12/376,672, filed Feb. 6, 2009 by Gauto et al.
PCT Written Opinion of the International PCT/EP 2006/061329, mailed Feb. 16, 2007.

(Continued)

Primary Examiner — Vivian Chen
(74) Attorney, Agent, or Firm — Miles & Stockbridge, P.C.

(57) ABSTRACT

The instant invention relates to storage stable aqueous solutions of stilbene optical brighteners with polyvinyl alcohols which can be directly used by the papermaker in that they may be diluted with water and/or be metered directly into a coating composition, to provide coated papers of a particularly high whiteness.

9 Claims, No Drawings

(56) References Cited

U.S. PATENT DOCUMENTS

| | | | |
|---|---|---|---|
| 2005/0022320 A1* | 2/2005 | Jackson | 8/516 |
| 2005/0124756 A1* | 6/2005 | Miller et al. | 524/557 |
| 2007/0186358 A1* | 8/2007 | Jackson | 8/648 |
| 2007/0245503 A1* | 10/2007 | Jackson et al. | 8/442 |
| 2009/0081475 A1 | 3/2009 | Jackson et al. | |
| 2010/0129553 A1* | 5/2010 | Jackson et al. | 427/288 |
| 2010/0294447 A1* | 11/2010 | Farrar et al. | 162/158 |
| 2011/0146929 A1* | 6/2011 | Jackson et al. | 162/172 |
| 2011/0168343 A1* | 7/2011 | Jackson et al. | 162/158 |
| 2011/0226993 A1* | 9/2011 | Jackson et al. | 252/301.25 |

FOREIGN PATENT DOCUMENTS

| | | | |
|---|---|---|---|
| WO | 99/67317 A1 | | 12/1999 |
| WO | 01/46161 A1 | | 6/2001 |
| WO | 03/044275 A1 | | 5/2003 |
| WO | WO 03/044275 | | 5/2003 |
| WO | WO 2004/005617 | * | 1/2004 |
| WO | WO 2005056658 | | 6/2005 |

OTHER PUBLICATIONS

English Abstract for JP 62106965, published May 18, 1997, Searching Authority PCT/EP 2006/061329, mailed Feb. 16, 2007.

USPTO Office Action for U.S. Appl. No. 12/376,672 mailed Jul. 13, 2011.

USPTO Office Action for U.S. Appl. No. 12/376,691 mailed Dec. 28, 2010.

Taiwanese Office Action dated Sep. 5, 2013, issued in Application No. 095112145 and English translation thereof.

\* cited by examiner

AQUEOUS SOLUTIONS OF OPTICAL BRIGHTENERS

The instant invention relates to storage stable aqueous solutions of stilbene optical brighteners with polyvinyl alcohols which can be directly used by the papermaker.

It is well known that the whiteness and thereby the attractiveness of coated papers can be improved by the addition of optical brighteners to the coating slip. In order to satisfy the demand for coated papers of higher whiteness, there is a need for more efficient optical brighteners.

WO 96/00221 discloses tetrasulphonated stilbene brighteners derived from amino acids for use in paper, textiles and detergents. Polyvinyl alcohols are included in a list of additives which are said to boost the performance of brighteners when applied to the surface of paper.

WO 98/42685 discloses hexasulphonated stilbene brighteners made by using certain amino acids, disclaiming the compounds of WO 96/00221. Also described is a method for the fluorescent whitening of a paper surface by applying the brightener as part of a pigmented coating composition which also comprises polyvinyl alcohol as a water-soluble co-binder or protective colloid.

EP 1355004 describes the use of certain stilbene brighteners which are not derived from amino acids for brightening aqueous coating slips comprising at least one latex binder and at least one synthetic co-binder differing therefrom. Polyvinyl alcohols are cited as being preferred synthetic co-binders.

Japanese Kokai 62-106965 discloses certain hexasulphonated stilbene brighteners derived from amino acids. The brighteners are claimed to be very effective for the fluorescent whitening of paper, and may be applied to the paper surface as part of a sizing solution or a pigmented coating composition. Polyvinyl alcohol is mentioned as a possible component of the sizing solution.

Even though it is known from the prior art that polyvinyl alcohol, among other compounds, can boost the brightening performance, until now the papermaker, when wanting to use said alcohol, has had to add it separately to the coating slip. Therefore a need still exists to simplify the process of preparing brightened, coated papers.

It has now surprisingly been found that it is possible to produce storage stable solutions consisting essentially of a stilbene optical brightener and a polyvinyl alcohol which may be used directly by the papermaker, in that they may be diluted with water and/or be metered directly into a coating composition, to provide coated papers of a particularly high whiteness.

The invention thus provides aqueous optical brightener solutions consisting essentially of
(a) at least one optical brightener of formula (1)

in which
M is hydrogen, an alkali metal atom, ammonium or a cation derived from an amine, preferably hydrogen or sodium, most preferably sodium,
n is 1 or 2, and
X is a natural or unnatural amino acid from which a hydrogen atom of the amino group has been removed;
(b) polyvinyl alcohol having a degree of hydrolysis greater than 75% and a Brookfield viscosity of 2-40 mPa·s (4% w/w aqueous solution at 20° C.); and
(c) water.

In optical brighteners for which n is 1, the $SO_3M$ group is preferably in the 4-position of the phenyl ring.

In optical brighteners for which n is 2, the $SO_3M$ groups are preferably in the 2,5-positions of the phenyl ring.

Examples of amino acids from which X may be derived are alanine, 2-aminobutyric acid, asparagine, aspartic acid, S-carboxymethylcysteine, cysteic acid, cysteine, glutamic acid, glutamine, glycine, iminodiacetic acid, isoleucine, leucine, methionine, N-methyltaurine, norleucine, norvaline, phenylalanine, 2-phenylglycine, pipecolinic acid, proline, sarcosine, serine, taurine, threonine, and valine. Where the amino acid contains a chiral centre, either optical isomer, or the racemic mixture, can be used.

Preferred amino acids are aspartic acid, glutamic acid and iminodiacetic acid.

The aqueous solutions may contain up to 10% by weight of salt, typically sodium chloride, formed as a by-product from the production of the optical brightener.

The aqueous solutions may also contain one or more antifreezes, biocides, complexing agents or other additives, as well as organic by-products formed during the preparation of the optical brightener.

The polyvinyl alcohol preferably has a degree of hydrolysis greater than or equal to 80% and a Brookfield viscosity of 2-20 mPa·s.

Preferably the weight ratio of polyvinyl alcohol to optical brightener lies in the range 0.01:1 to 1.5:1. More preferably, the ratio lies in the range 0.03:1 to 1:1.

The water content of the solution is suitably at least such that the solution is still stirrable and preferably easily pourable; in concentrated solutions the concentration of the optical brightener is advantageously in the range 6 to 60%, preferably 10 to 50% by weight of the solution.

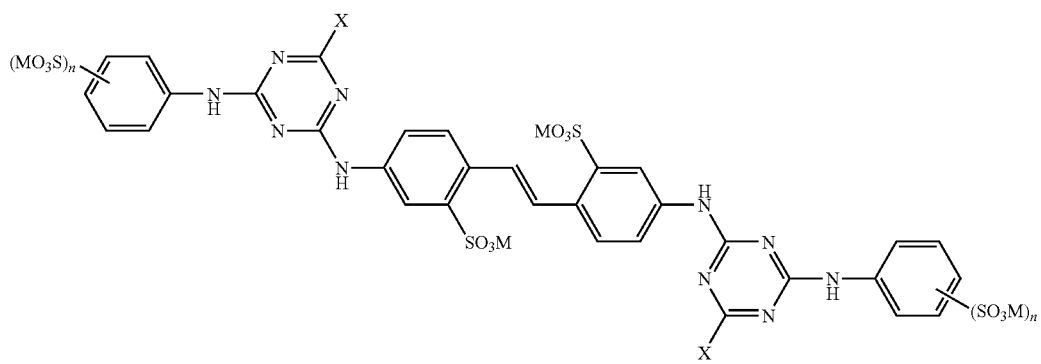

(1)

The pH of the aqueous solutions is preferably from neutral to clearly alkaline, in particular in the range pH 7 to pH 10. The pH may, if necessary, be adjusted by addition of M-corresponding bases, e.g. alkali metal hydroxides or carbonates, ammonia or amines.

The optical brightener solutions of the invention are storage-stable and may be used directly as such, in that they may be diluted with water and/or be metered directly into a coating composition. Thus a further object of the invention is the addition of the brightener solutions to coating compositions in order to obtain a coated and optically brightened paper.

Thus, the invention also provides a process for the production of coated paper that is optically brightened at least in the coating, wherein a coating composition as described above is coated onto paper after sheet formation.

The coating compositions are essentially aqueous compositions that contain at least one binder and a white pigment, in particular an opacifying white pigment, and may additionally contain further additives such as dispersing agents and defoamers.

Although it is possible to produce coating compositions that are free from white pigments, the best white substrates for printing are made using opaque coating compositions that contain 10-70% white pigment by weight. Such white pigments are generally inorganic pigments, e.g., aluminium silicates (kaolin, otherwise known as china clay), calcium carbonate (chalk), titanium dioxide, aluminium hydroxide, barium carbonate, barium sulphate, or calcium sulphate (gypsum).

The binders may be any of those commonly used in the paper industry for the production of coating compositions and may consist of a single binder or of a mixture of primary and secondary binders. The sole or primary binder is preferably a synthetic latex, typically a styrene-butadiene, vinyl acetate, styrene acrylic, vinyl acrylic or ethylene vinyl acetate polymer. The secondary binder may be, e.g., starch, carboxymethylcellulose, casein, soy polymers, or polyvinyl alcohol.

The sole or primary binder is used in an amount typically in the range 5-25% by weight of white pigment. The secondary binder is used in an amount typically in the range 0.1-10% by weight of white pigment.

The optical brightener of formula (1) is used in an amount typically in the range 0.01-1% by weight of white pigment, preferably in the range 0.05-0.5% by weight of white pigment.

EXAMPLES

The following examples shall explain the instant invention in more detail. If not indicated otherwise, "%" and "parts" are by weight; viscosities are measured on a 4% aqueous solution at 20° C. using a Brookfield viscometer.

Preparative Example 1A

Optical brightener solution 1a is produced by stirring together 13.1 parts (0.01 mol) of an optical brightener of formula (4), 6.3 parts of a polyvinyl alcohol having a degree of hydrolysis of 98.5% and a Brookfield viscosity of 2.75 mPa·s, and 80.6 parts of water while heating to 90-95° C., until a clear solution is obtained that remains stable after cooling to room temperature. The pH of the solution is adjusted to 9.0 with sodium hydroxide.

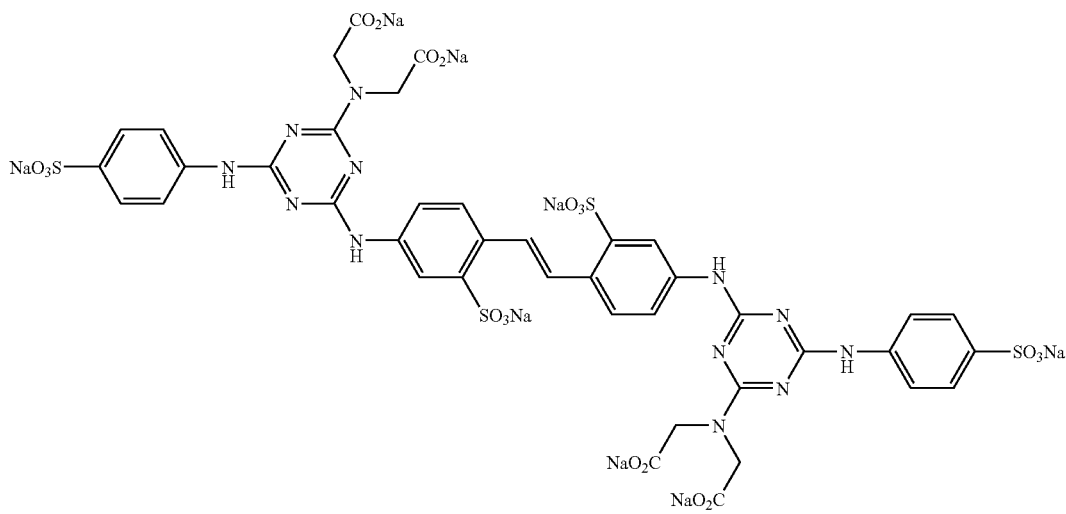

(4)

Preparative Example 1B

Optical brightener solution 1b is produced by stirring together 15.1 parts (0.01 mol) of an optical brightener of formula (5), 6.3 parts of a polyvinyl alcohol having a degree of hydrolysis of 98.5% and a Brookfield viscosity of 2.75 mPa·s, and 78.6 parts of water while heating to 90-95° C., until a clear solution is obtained that remains stable after cooling to room temperature. The pH of the solution is adjusted to 9.0 with sodium hydroxide.

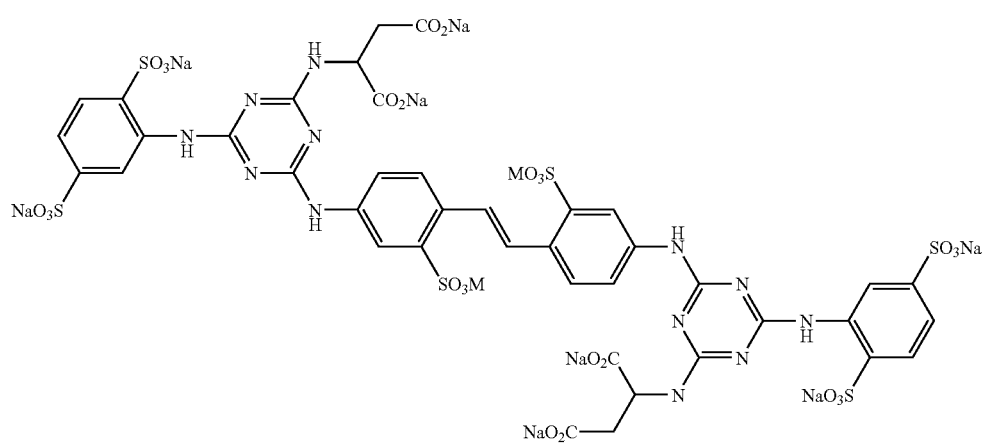

(5)

Preparative Example 1C

Comparative Example (Without Polyvinyl Alcohol)

Optical brightener solution 1c is produced by stirring together
- 15.1 parts (0.01 mol) of an optical brightener of formula (5), and
- 84.9 parts of water. The pH of the solution is adjusted to 9.0 with sodium hydroxide.

Preparative Example 1D

Comparative Example Representing the State-of-the-Art (EP 1355004)

Optical brightener solution 1d is produced by stirring together
- 12.2 parts (0.01 mol) of an optical brightener of formula (6),
- 6.3 parts of a polyvinyl alcohol having a degree of hydrolysis of 98.5% and a Brookfield viscosity of 2.75 mPa·s, and
- 81.5 parts of water while heating to 90-95° C., until a clear solution is obtained that remains stable after cooling to room temperature. The pH of the solution is adjusted to 9.0 with sodium hydroxide.

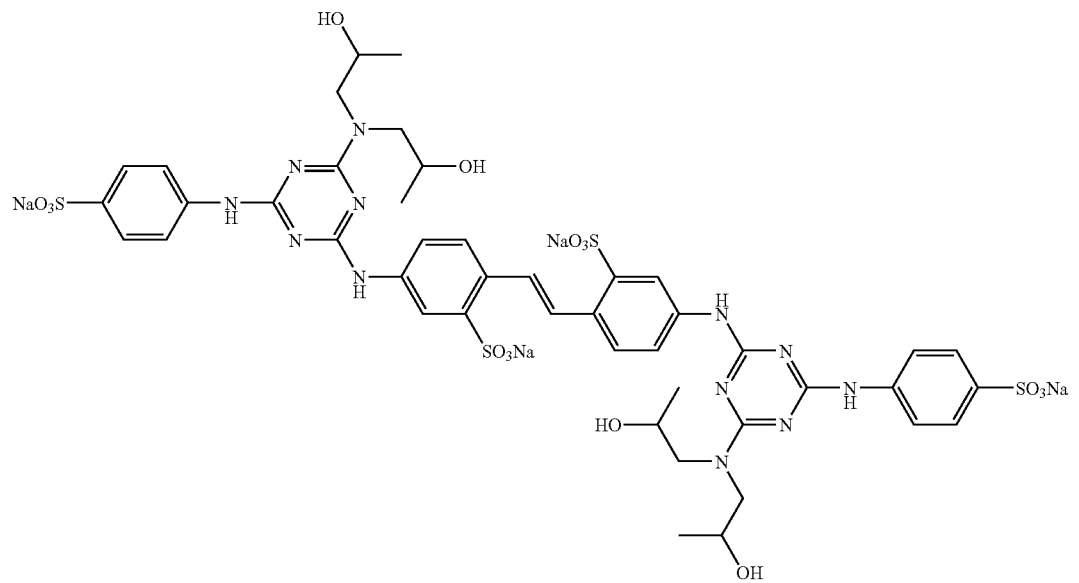

(6)

Preparative Example 2A

Optical brightener solution 2a is produced by stirring together
- 13.1 parts (0.01 mol) of an optical brightener of formula (4),
- 6.3 parts of a polyvinyl alcohol having a degree of hydrolysis of 85% and a Brookfield viscosity of 3.7 mPa·s, and
- 80.6 parts of water while heating to 90-95° C., until a clear solution is obtained that remains stable after cooling to room temperature. The pH of the solution is adjusted to 9.0 with sodium hydroxide.

Preparative Example 2B

Optical brightener solution 2b is produced by stirring together
- 15.1 parts (0.01 mol) of an optical brightener of formula (5),
- 6.3 parts of a polyvinyl alcohol having a degree of hydrolysis of 85% and a Brookfield viscosity of 3.7 mPa·s, and
- 78.6 parts of water while heating to 90-95° C., until a clear solution is obtained that remains stable after cooling to room temperature. The pH of the solution is adjusted to 9.0 with sodium hydroxide.

Preparative Example 2C

Comparative Example (Without Polyvinyl Alcohol)

Optical brightener solution 2c is produced by stirring together
- 15.1 parts (0.01 mol) of an optical brightener of formula (5), and
- 84.9 parts of water. The pH of the solution is adjusted to 9.0 with sodium hydroxide.

Preparative Example 2D

Comparative Example Representing the State-of-the-Art (EP 1355004)

Optical brightener solution 2d is produced by stirring together
- 12.2 parts (0.01 mol) of an optical brightener of formula (6),
- 6.3 parts of a polyvinyl alcohol having a degree of hydrolysis of 85% and a Brookfield viscosity of 3.7 mPa·s, and
- 81.5 parts of water while heating to 90-95° C., until a clear solution is obtained that remains stable after cooling to room temperature. The pH of the solution is adjusted to 9.0 with sodium hydroxide.

Preparative Example 3A

Optical brightener solution 3a is produced by stirring together
- 18.9 parts (0.0125 mol) of an optical brightener of formula (5),
- 1.2 parts of a polyvinyl alcohol having a degree of hydrolysis of 85% and a Brookfield viscosity of 3.7 mPa·s, and
- 79.9 parts of water while heating to 90-95° C., until a clear solution is obtained that remains stable after cooling to room temperature. The pH of the solution is adjusted to 9.0 with sodium hydroxide.

Preparative Example 3B

Comparative Example (Without Polyvinyl Alcohol)

Optical brightener solution 3b is produced by stirring together
- 18.9 parts (0.0125 mol) of an optical brightener of formula (5), and
- 81.1 parts of water. The pH of the solution is adjusted to 9.0 with sodium hydroxide.

Application Example 1

A coating composition is prepared containing 500 parts chalk (commercially available under the trade name Hydrocarb 90 from OMYA), 500 parts clay (commercially available under the trade name Kaolin SPS from IMERYS), 470 parts water, 6 parts dispersing agent (a sodium salt of a polyacrylic acid commercially available under the trade name Polysalz S from BASF), 200 parts latex (an acrylic ester copolymer commercially available under the trade name Acronal S320D from BASF) and 50 parts of a 10% solution of carboxymethyl cellulose (commercially available under the trade name Finnfix 5.0 from Noviant) in water. The solids content is adjusted to 60% by the addition of water, and the pH is adjusted to 8-9 with sodium hydroxide.

Solutions 1a, 1b, 1c and 1d, made as described in Preparative Examples 1A, 1B, 1C and 1D respectively, are added at a range of concentrations from 0.5 to 4.0% to the stirred coating composition. The brightened coating composition is then applied to a commercial 75 gsm neutral-sized white paper base sheet using an automatic wire-wound bar applicator with a standard speed setting and a standard load on the bar. The coated paper is then dried for 5 minutes in a hot air flow. The dried paper is allowed to condition, then measured for CIE Whiteness on a calibrated Elrepho spectrophotometer.

TABLE 1

| Conc. of Soln. (%) | CIE Whiteness using Soln. 1a | CIE Whiteness using Soln. 1b | CIE Whiteness using Soln. 1c (Comparative) | CIE Whiteness using Soln. 1d (Comparative) |
|---|---|---|---|---|
| 0 | 89.1 | 89.1 | 89.1 | 89.1 |
| 0.5 | 100.7 | 101.3 | 98.3 | 98.3 |
| 1.0 | 107.2 | 106.4 | 101.6 | 104.6 |
| 2.0 | 114.2 | 114.2 | 109.3 | 110.9 |
| 4.0 | 118.9 | 121.4 | 114.7 | 117.5 |

Application Example 2

Application Example 1 is repeated using Solutions 2a, 2b, 2c and 2d, made as described in Preparative Examples 2A, 2B, 2C and 2D respectively.

TABLE 2

| Conc. of Soln. (%) | CIE Whiteness using Soln. 2a | CIE Whiteness using Soln. 2b | CIE Whiteness using Soln. 2c (Comparative) | CIE Whiteness using Soln. 2d (Comparative) |
|---|---|---|---|---|
| 0 | 89.1 | 89.1 | 89.1 | 89.1 |
| 0.5 | 98.2 | 98.3 | 98.3 | 97.9 |
| 1.0 | 106.8 | 104.3 | 101.6 | 102.2 |
| 2.0 | 111.2 | 110.5 | 109.3 | 108.0 |
| 4.0 | 114.8 | 118.1 | 114.7 | 112.8 |

Application Example 3

A coating composition is prepared containing 500 parts chalk (commercially available under the trade name Hydrocarb 90 from OMYA), 500 parts clay (commercially available under the trade name Kaolin SPS from IMERYS), 370 parts water, 6 parts dispersing agent (a sodium salt of a polyacrylic acid commercially available under the trade name Polysalz S from BASF), 200 parts latex (an acrylic ester copolymer commercially available under the trade name Acronal S320D from BASF) and 400 parts of a 20% solution of an anionic potato starch (Perfectamyl A4692 from AVEBE B.A.) in water. The solids content is adjusted to 60% by the addition of water, and the pH is adjusted to 8-9 with sodium hydroxide.

Solutions 3a and 3b, made as described in Preparative Examples 3A and 3B respectively, are added at a range of concentrations from 0.5 to 4.0% to the stirred coating composition. The brightened coating composition is then applied to a commercial 75 gsm neutral-sized white paper base sheet using an automatic wire-wound bar applicator with a standard speed setting and a standard load on the bar. The coated paper is then dried for 5 minutes in a hot air flow. The dried paper is allowed to condition, then measured for CIE Whiteness on a calibrated Elrepho spectrophotometer.

TABLE 3

| Conc. of Soln. (%) | CIE Whiteness using Soln. 3a | CIE Whiteness using Soln. 3b (Comparative) |
|---|---|---|
| 0 | 87.9 | 87.9 |
| 0.5 | 99.4 | 98.2 |
| 1.0 | 106.4 | 104.9 |
| 2.0 | 114.8 | 112.1 |
| 4.0 | 123.2 | 120.8 |

The instant results clearly show the surprising superiority in whiteness of the instant solutions containing polyvinyl alcohol.

The invention claimed is:

1. A coating composition containing an aqueous optical brightener solution consisting essentially of
   (a) at least one optical brightener of formula (1)

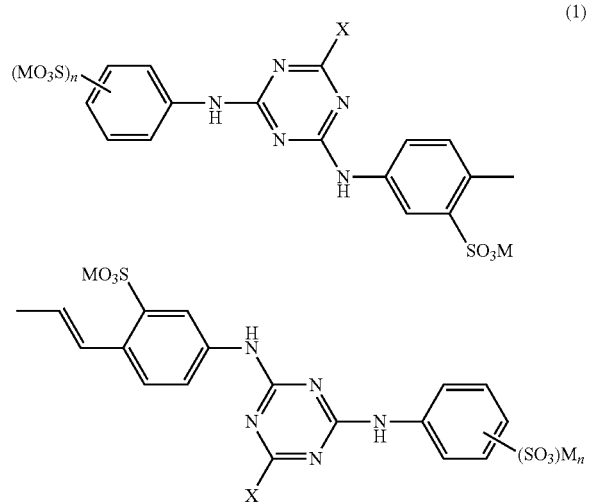

(1)

wherein
M is hydrogen, an alkali metal atom, ammonium or a cation derived from an amine,
n is 1 or 2, and
X is aspartic acid or iminodiacetic acid from which a hydrogen atom of the amino group has been removed;
   (b) a polyvinyl alcohol having a degree of hydrolysis greater than 75% and a Brookfield viscosity of 2-40 mPas;
   (c) water,
   wherein the weight ratio of the polyvinyl alcohol to the optical brightener is from 0.03:1 to 0.48:1 and wherein the concentration of the optical brightener is from 10 to 50% by weight,
       wherein the coating composition further comprises from 10 to 70% by weight of one or more white pigments,
       wherein the coating composition further contains a primary binder based on synthetic latex, wherein the primary binder is selected from the group consisting of: styrene-butadiene, vinyl acetate, styrene acrylic, vinyl acrylic and ethylene vinyl acetate polymer and a secondary binder selected from the group consisting of starch, carboxymethylcellulose, casein, soy polymers, and polyvinyl alcohol,
       wherein the primary binder is used in an amount from 5 to 25% by weight of the one or more white pigments, wherein the secondary binder is used in an amount from 0.1 to 10% by weight of the one or more white pigments and wherein the optical brightener of formula (1) is used in the coating composition in an amount from 0.01 to 1% by weight of the one or more white pigments.

2. A coating composition according to claim 1 wherein M is hydrogen or sodium, n is 2, wherein the polyvinyl alcohol has a degree of hydrolysis of greater than or equal to 80% and a Brookfield viscosity of 2-20 mPas.

3. A paper coated with a coating composition according to claim 1.

4. The coating composition according to claim 1, the optical brightener solution further containing up to 10% by weight of salt, wherein the salt is a by-product from the production of the optical brightener.

5. The coating composition according to claim 1, the optical brightener solution further containing one or more antifreezes, biocides, or complexing agents.

6. The coating composition according to claim 1, the optical brightener solution further containing one or more organic by-products formed during the preparation of the optical brightener.

7. A coating composition according to claim 1, comprising 0.5 to 4% of the solution.

8. A process for the production of a coated paper comprising the step of coating a coating composition comprising a solution onto the paper after sheet formation,
   wherein the solution comprises an aqueous optical brightener solution consisting essentially of
   (a) at least one optical brightener of formula (1)

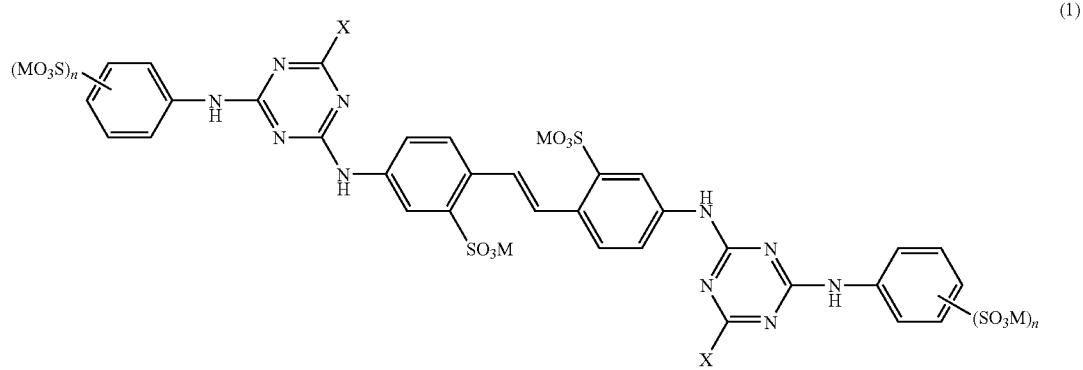

(1)

wherein

M is hydrogen, an alkali metal atom, ammonium or a cation derived from an amine, n is 1 or 2, and X is aspartic acid or iminodiacetic acid from which a hydrogen atom of the amino group has been removed;

(b) a polyvinyl alcohol having a degree of hydrolysis greater than 75% and a Brookfield viscosity of 2-40 mPas; and (c) water, wherein the weight ratio of the polyvinyl alcohol to the optical brightener is from 0.03:1 to 0.48:1 and wherein the concentration of the optical brightener is from 10 to 50% by weight, wherein the coating composition further comprises from 10 to 70% by weight of one or more white pigments, wherein the coating composition further contains a primary binder based on synthetic latex, wherein the primary binder is selected from the group consisting of: styrene-butadiene, vinyl acetate, styrene acrylic, vinyl acrylic and ethylene vinyl acetate polymer and a secondary binder selected from the group consisting of starch, carboxymethylcellulose, casein, soy polymers, and polyvinyl alcohol, wherein the primary binder is used in an amount from 5 to 25% by weight of the one or more white pigments, wherein the secondary binder is used in an amount from 0.1 to 10% by weight of the one or more white pigments and wherein the optical brightener of formula (1) is used in the coating composition in an amount from 0.01 to 1% by weight of the one or more white pigments.

9. A process according to claim 8 wherein the optical brightener of formula (1) is used in the coating composition in an amount from 0.05 to 0.5% by weight of the one or more white pigments.

* * * * *